United States Patent
Carey et al.

(10) Patent No.: US 12,384,437 B2
(45) Date of Patent: Aug. 12, 2025

(54) PAINT SPRAYER

(71) Applicant: TriTech Industries, Inc., Union, NJ (US)

(72) Inventors: Danuta H. Carey, Stockholm, NJ (US); Christopher M. Walsh, Florham Park, NJ (US); Bryan J. Tenbroeck, Iselin, NJ (US)

(73) Assignee: TriTech Industries, Inc., Union, NJ (US)

( * ) Notice: Subject to any disclaimer, the term of this patent is extended or adjusted under 35 U.S.C. 154(b) by 321 days.

(21) Appl. No.: 18/140,851

(22) Filed: Apr. 28, 2023

(65) Prior Publication Data

US 2024/0239391 A1 Jul. 18, 2024

Related U.S. Application Data

(63) Continuation-in-part of application No. 29/882,620, filed on Jan. 17, 2023.

(51) Int. Cl.
*B62B 1/26* (2006.01)
*B05B 9/00* (2006.01)
(Continued)

(52) U.S. Cl.
CPC ............ *B62B 1/26* (2013.01); *B05B 9/007* (2013.01); *B05B 9/04* (2013.01); *B62B 1/125* (2013.01); *B62B 1/008* (2013.01); *B62B 2202/60* (2013.01)

(58) Field of Classification Search
CPC .......... B62B 1/26; B62B 1/125; B62B 1/008; B62B 2202/60; B05B 9/007; B05B 8/04
See application file for complete search history.

(56) References Cited

U.S. PATENT DOCUMENTS 1,965,944 A 7/1934 Lea
2,129,316 A 9/1938 Cramer
(Continued)

FOREIGN PATENT DOCUMENTS

AU 2021107037 A4 * 12/2021 ............ B05B 15/65
CA 2762195 A1 6/2012
(Continued)

OTHER PUBLICATIONS

"NPL.YouTube1" May 9, 2022, YouTube,com, site visited Jul. 8, 2024: https://www.youtube.com/watchv=IPVn6vjWNTY (Year: 2022).
(Continued)

*Primary Examiner* — Steven M Cernoch
(74) *Attorney, Agent, or Firm* — Collard & Roe, P.C.

(57) ABSTRACT

A paint sprayer includes a cart assembly supporting a motor and a fluid intake conduit. The cart assembly has a frame with a pair of spaced-apart legs for supporting the cart assembly in an upright position, a telescoping handle movable between a retracted handle position and an extended handle position, an upper bracket projecting from the telescoping handle and a telescoping support movable between a retracted support position and an extended support position. The telescoping support supports the cart assembly in an inclined position between the upright position and a horizontal position of the cart assembly. The cart assembly has a pair of lower wheels for rolling the cart assembly when tilted back from the upright position and at least one upper wheel disposed on the telescoping handle for rolling the cart assembly along with the pair of lower wheels when in the horizontal position.

16 Claims, 9 Drawing Sheets

(51) Int. Cl.
    *B05B 9/04*           (2006.01)
    *B62B 1/00*           (2006.01)
    *B62B 1/12*           (2006.01)

(56) References Cited

U.S. PATENT DOCUMENTS

| | | |
|---|---|---|
| 2,141,881 A | 12/1938 | Schray |
| 2,160,041 A | 5/1939 | Sooter |
| 2,277,302 A | 3/1942 | Chenette |
| 2,818,988 A | 1/1958 | Dunkin |
| 3,083,030 A | 3/1963 | Sides |
| 3,223,429 A | 12/1965 | Hastings |
| 3,305,137 A * | 2/1967 | Gauthier ............. F04B 17/06 222/626 |
| 3,460,850 A | 8/1969 | Franklin |
| 3,475,036 A | 10/1969 | Smith |
| 3,497,234 A | 2/1970 | Schray |
| 3,797,849 A | 3/1974 | Sherman |
| 4,620,712 A | 11/1986 | Blackwell |
| 5,217,238 A | 6/1993 | Cyphers et al. |
| 5,286,045 A | 2/1994 | Cyphers et al. |
| 5,441,297 A | 8/1995 | Krohn et al. |
| D365,022 S | 12/1995 | Wada |
| 5,567,323 A | 10/1996 | Harrison, Jr. |
| 5,775,865 A | 7/1998 | Capilupi, Jr. |
| 6,318,808 B1 | 11/2001 | Shayne |
| 6,488,846 B1 | 12/2002 | Marangi |
| 6,758,482 B2 | 7/2004 | Stallbaumer |
| 6,971,654 B2 | 12/2005 | Amsili |
| 7,240,909 B2 | 7/2007 | Robens |
| D560,271 S | 1/2008 | Kesti et al. |
| D580,518 S | 11/2008 | Johnson et al. |
| 7,497,389 B2 | 3/2009 | Rioux |
| D596,707 S | 7/2009 | Mattson et al. |
| D597,173 S | 7/2009 | Mulgrew et al. |
| D608,414 S | 1/2010 | Legatt et al. |
| D616,065 S | 5/2010 | Gundersen et al. |
| D639,311 S | 6/2011 | Peterson et al. |
| D644,395 S | 8/2011 | Dechant et al. |
| 8,128,106 B2 | 3/2012 | Hollins et al. |
| D661,860 S | 6/2012 | Ryan et al. |
| D663,008 S | 7/2012 | Varini |
| D667,193 S | 9/2012 | Ryan et al. |
| D667,194 S | 9/2012 | Ryan et al. |
| 8,820,756 B2 | 9/2014 | Hyronyetz |
| 8,979,001 B2 | 3/2015 | Peterson et al. |
| D733,840 S | 7/2015 | Butler et al. |
| D743,444 S | 11/2015 | Walsh et al. |
| D800,252 S | 10/2017 | Zientara et al. |
| D803,893 S | 11/2017 | Daeger et al. |
| D806,212 S | 12/2017 | Legatt et al. |
| D817,444 S | 5/2018 | Zientara et al. |
| D817,445 S | 5/2018 | Zientara et al. |
| D963,795 S | 9/2022 | Yang et al. |
| 2003/0080538 A1 | 5/2003 | Watts et al. |
| 2006/0108449 A1 | 5/2006 | Sodemann et al. |
| 2006/0273537 A1 | 12/2006 | Robens |
| 2011/0253229 A1 | 10/2011 | Mattson et al. |
| 2011/0297756 A1 | 12/2011 | Peterson et al. |
| 2012/0153585 A1 | 6/2012 | Ryan et al. |
| 2013/0270359 A1 * | 10/2013 | Saxton ............... B05B 7/0093 239/146 |
| 2017/0297045 A1 | 10/2017 | Anderson |
| 2018/0030967 A1 | 2/2018 | Sulzer |
| 2019/0232308 A1 | 8/2019 | Becker et al. |
| 2024/0017755 A1 | 1/2024 | Davyov-Babaev |
| 2024/0123459 A1 | 4/2024 | Kieffer et al. |

FOREIGN PATENT DOCUMENTS

| | | | |
|---|---|---|---|
| CN | 302703807 | 1/2014 | |
| CN | 303472882 | 1/2016 | |
| CN | 303719534 | 6/2016 | |
| CN | 304104866 | 4/2017 | |
| CN | 304776510 | 8/2018 | |
| CN | 112593677 A * | 4/2021 | ............. B05B 12/32 |
| EP | 2465746 A1 | 6/2012 | |
| KR | 300911970.0000 | 6/2017 | |
| RU | 2706542 C1 * | 11/2019 | ............. A01G 25/09 |
| WO | 235207-001 | 12/2023 | |

OTHER PUBLICATIONS

"NPL.YouTube2" May 10, 2022, YouTube,com, site visited Jul. 8, 2024: https://www.youtube.com/watch?v=iD3JujYzpJU (Year: 2022).

"NPL.YouTube. TriTechT8" Jun. 23, 2020, YouTube, site visited Jul. 17, 2024: https://www.youtube.com/watch?v=R1 RoxShoXCw (Year: 2020).

"NPL.Milwaukee" Feb. 7, 2018, Amazon.com, site visited Jul. 24, 2024: https://www.amazon.com/Milwaukee-800-Capacity-Handle-Truck/dp/B079LH DDJ7 (Year: 2018).

Notification of Transmittal of The International Search Report and The Written Opinion of The International Searching Authority, or The Declaration, International Search Report and Written Opinion of the International Searching Authority in International Application No. PCT/US24/10008, dated Apr. 10, 2024.

\* cited by examiner

PAINT SPRAYER

CROSS REFERENCE TO RELATED APPLICATIONS

This application is a Continuation-in Part application of and claims priority under 35 U.S.C. § 120 and the benefit of co-pending U.S. Design patent application No. 29/882,620 filed on Jan. 17, 2023, the disclosure of which is hereby incorporated by reference in its entirety.

BACKGROUND OF THE INVENTION

Field of the Invention

The invention relates to a paint sprayer, in particular a portable paint sprayer and a method for operating and transporting a portable paint sprayer.

The Prior Art

Various paint sprayer devices are known. It is known to mount such paint sprayers to a wheeled frame for moving the paint sprayer to and from a location where it is to be operated. Due to their large, bulky size and heavy weight (paint sprayers may weigh between 50 and 200 pounds, even without an associated hose and spray gun) existing paint sprayers typically require two persons to load and/or unload the paint sprayer into/out of a vehicle, for example a truck bed, van floor or the like.

Moreover, operators often need to employ loading ramps to roll the bulky, heavy paint sprayer to and from the surface of the vehicle which is elevated relative to the floor or ground. Such loading ramps take up additional space in the vehicle when being transported with the paint sprayer and require additional room behind the vehicle when being used. Because storage space in the vehicle and parking area size may be limited, it would be advantageous to eliminate the need for ramps when loading and unloading the paint sprayer.

Accordingly, a need exists for a paint sprayer arrangement which can be easily loaded and unloaded into and out of a vehicle by one person without the need for ramps or other equipment.

SUMMARY OF THE INVENTION

The invention relates to a paint sprayer, in particular a portable paint sprayer and a method for operating and transporting a portable paint sprayer.

A paint sprayer according to an aspect of the invention includes a motor having a gear box and a fluid intake conduit coupled to the motor. The fluid intake conduit includes an inlet end configured to be submerged in a container of paint. The paint sprayer further includes an outlet fitting in fluid communication with the fluid intake conduit and a cart assembly supporting the motor and the fluid intake conduit. The cart includes a frame having a pair of spaced-apart legs disposed at a lower portion of the frame and configured to support the cart assembly in an upright position of the cart assembly; a telescoping handle disposed at an upper portion of the frame and movable between a retracted handle position and an extended handle position; an upper bracket projecting from the telescoping handle and configured to receive a first portion of a coiled flexible hose; and a telescoping support disposed between the lower portion of the frame and the upper portion of the frame and movable between a retracted support position and an extended support position. The telescoping support is configured to support the cart assembly in an inclined position of the cart assembly between the upright position of the cart assembly and a horizontal position of the cart assembly. The telescoping support is also configured to receive a second portion of the coiled flexible hose.

The cart assembly further includes a pair of lower wheels disposed at the lower portion of the frame and configured for rolling the cart assembly when tilted back from the upright position and at least one upper wheel disposed on the telescoping handle and configured for rolling the cart assembly along with the pair of lower wheels when in the horizontal position.

According to a further aspect of the invention, the motor is an electric motor.

According to a further aspect of the invention, the at least one upper wheel is a pair of upper wheels.

According to a further aspect of the invention, the paint sprayer has a respective grip handle disposed on each of the pair of spaced-apart legs.

According to a further aspect of the invention, the telescoping handle has a locking mechanism configured for locking the telescoping handle in the retracted handle position and the extended handle position.

According to a further aspect of the invention, the locking mechanism for the telescoping handle includes a plurality of spaced apart openings and a spring biased button.

According to a further aspect of the invention, the telescoping support has a locking mechanism configured for locking the telescoping support in the retracted support position and the extended support position.

According to a further aspect of the invention, the locking mechanism for the telescoping support includes a plurality of spaced apart openings and a spring biased button.

A method for operating and transporting a paint sprayer according to an aspect of the invention includes the step of providing a paint sprayer including a motor having a gear box, a fluid intake conduit coupled to the motor, an outlet fitting in fluid communication with the fluid intake conduit, a cart assembly supporting the motor and the fluid intake conduit, the cart assembly including a frame having a pair of spaced-apart legs disposed at a lower portion of the frame, a telescoping handle disposed at an upper portion of the frame, an upper bracket projecting from the telescoping handle and a telescoping support disposed between the lower portion of the frame and the upper portion of the frame, the cart assembly further including a pair of lower wheels disposed at the lower portion of the frame and at least one upper wheel disposed on the telescoping handle.

The method further includes the step of moving the paint sprayer to a selected location by grasping the telescoping handle, tilting the cart assembly back from an upright position of the cart assembly and rolling the cart assembly on the pair of lower wheels.

The method further includes the step extending the telescoping support into an extended support position and tilting the cart assembly back such that the paint sprayer is supported by the telescoping support in an inclined position of the cart assembly between the upright position of the cart assembly and a horizontal position of the cart assembly for placing a container of paint under an inlet end of the fluid intake conduit.

The method further includes the step of retracting the telescoping support into a retracted support position and loading the paint sprayer onto a support surface of a vehicle by positioning the at least one upper wheel on the support surface of the vehicle, lifting the cart assembly into the horizontal position and rolling the cart assembly onto the support surface on the pair of lower wheels and the at least one upper wheel.

In a method according to a further aspect of the invention, the step of lifting the cart assembly into the horizontal position includes grasping each of a respective grip handle disposed on each of the pair of spaced-apart legs.

In a method according to a further aspect of the invention, the step of extending the telescoping support into the extended support position includes locking the telescoping support in the extended support position with a locking mechanism.

In a method according to a further aspect of the invention, the step of retracting the telescoping support into the retracted support position includes locking the telescoping support in the retracted support position with a locking mechanism.

A method according to a further aspect of the invention includes the steps of supporting a coiled flexible hose between the upper bracket and the telescoping support with the telescoping handle in an extended handle position; moving the telescoping handle from the extended handle position to a retracted handle position; and removing the coiled flexible hose from the upper bracket and the telescoping support.

In a method according to a further aspect of the invention, the inclined position of the cart assembly is in the range of 45 to 60 degrees from the upright position of the cart assembly.

In a method according to a further aspect of the invention, the support surface of the vehicle is a truck bed or a floor of a van.

In a method according to a further aspect of the invention, the step of loading the paint sprayer onto the support surface of the vehicle is completed without the use of a ramp.

An advantage of a paint sprayer and a method for operating and transporting a paint sprayer according to embodiments of the invention is the provision of a paint sprayer arrangement which can be easily loaded and unloaded into and out of a vehicle by one person without the need for ramps or other equipment.

Moreover, a paint sprayer and a method for operating and transporting a paint sprayer according to embodiments of the invention can be easily loaded and unloaded into and out of a vehicle as a complete paint spraying rig, including the paint sprayer and its associated hose(s) and paint spray gun(s)

Another advantage of a paint sprayer and a method for operating and transporting a paint sprayer according to embodiments of the invention is that a coiled flexible hose may be securely supported between an upper support bracket coupled to a locking telescoping handle and a lower locking telescoping support with the telescoping handle in an extended handle position and the coiled flexible hose can be easily removed from the two supports when the telescoping handle is moved from the extended handle position to a retracted handle position.

Another advantage of a paint sprayer and a method for operating and transporting a paint sprayer according to embodiments of the invention is that a container of paint, such as a five gallon bucket of paint, can be easily placed in close proximity to the inlet end of a fluid intake conduit of the paint sprayer by extending a telescoping support into an extended support position and tilting the cart assembly back such that the paint sprayer is supported by the telescoping support in an inclined position of the cart assembly between an upright position and a horizontal position, for example at an angle in the range of 45 to 60 degrees from the upright position.

BRIEF DESCRIPTION OF THE DRAWINGS

Other advantages, benefits and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE DRAWINGS

Figure 1:
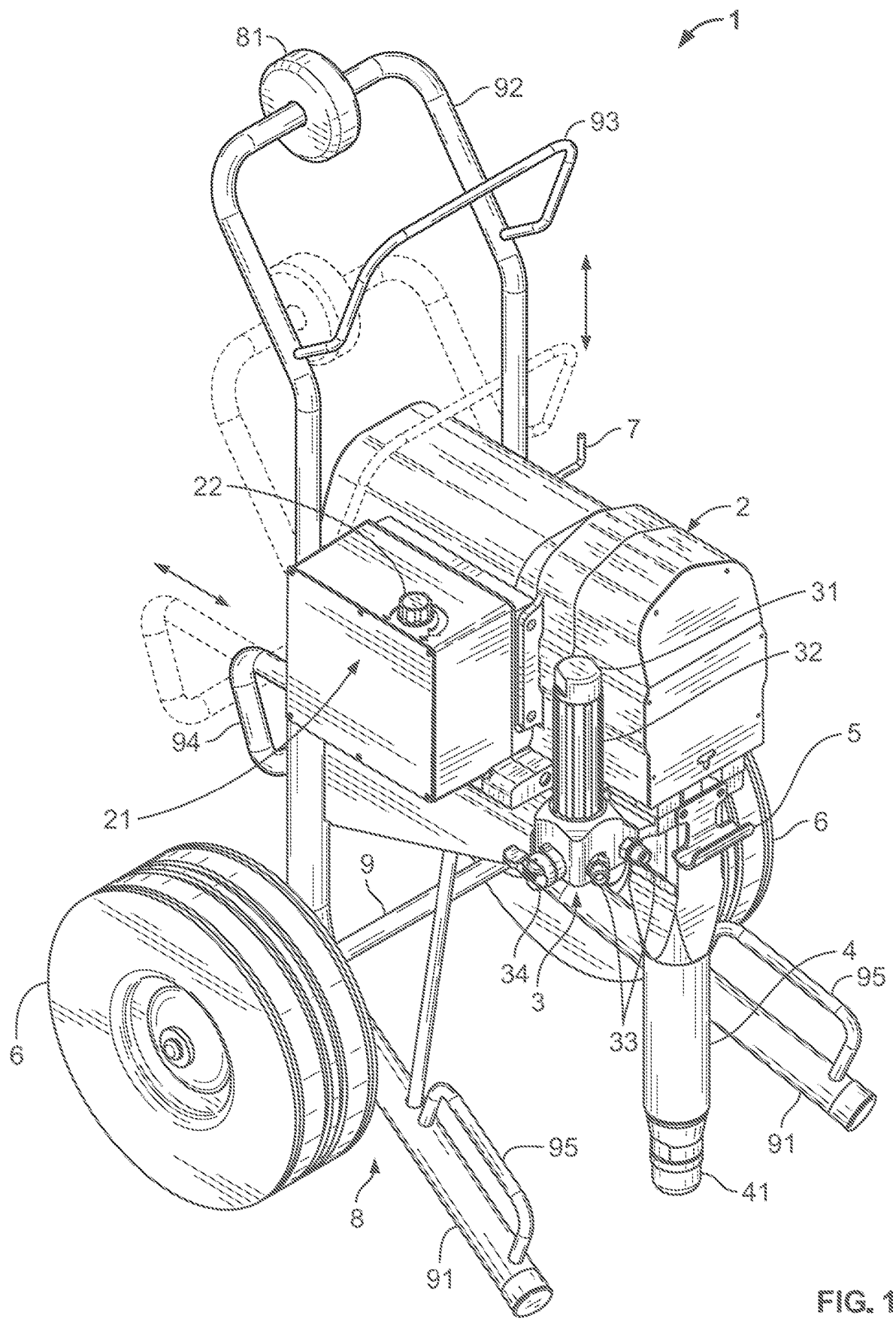
FIG. 1 shows a perspective view of a paint sprayer according to an embodiment of the invention.
Figure 2:
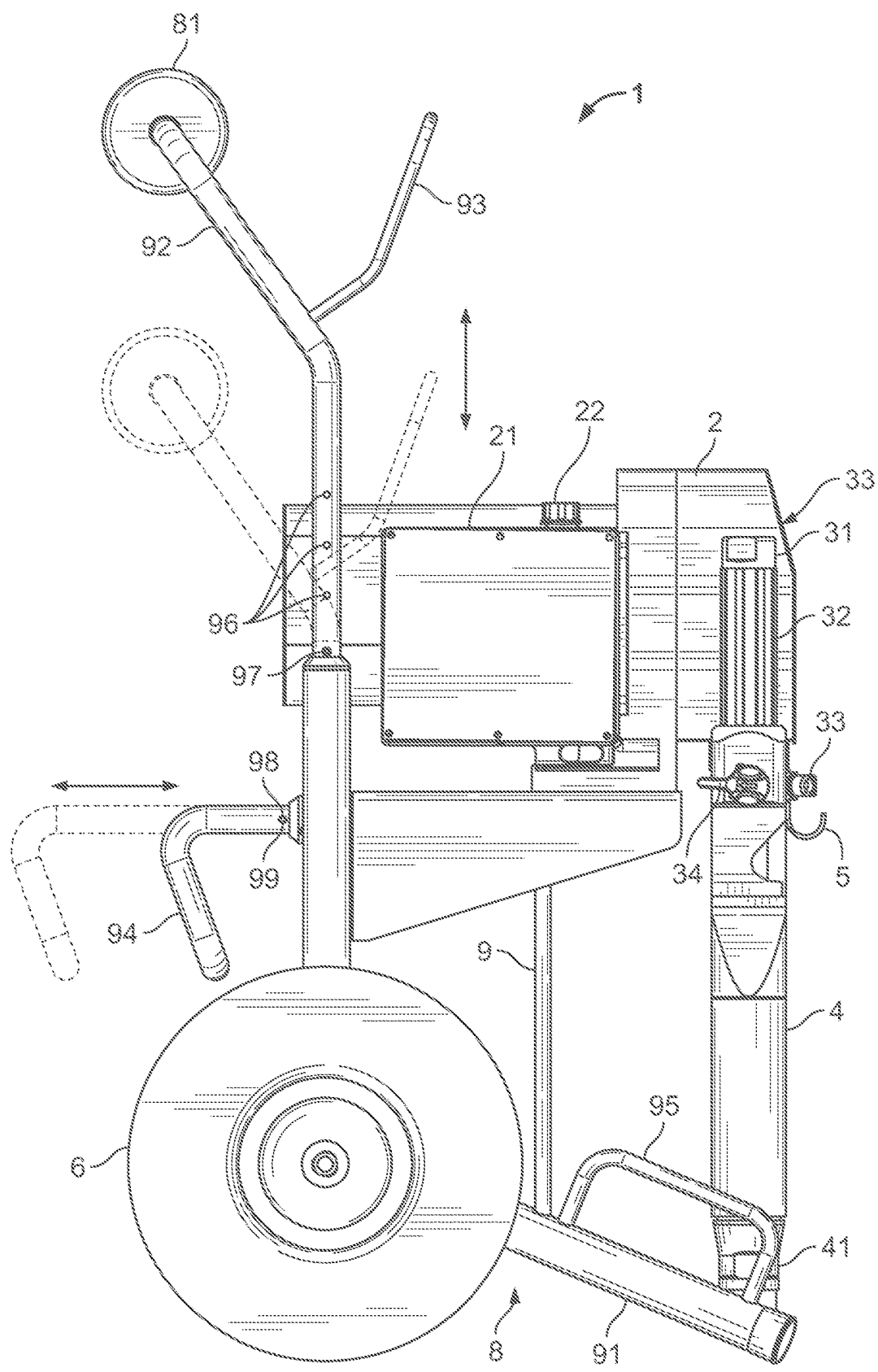
FIG. 2 shows a side view of the paint sprayer shown in FIG. 1.

Referring now in detail to the drawings, and in particular FIG. 1, a shows a perspective view of a paint sprayer 1 according to an embodiment of the invention and FIG. 2 shows a side view of the paint sprayer 1 shown in FIG. 1. The paint sprayer 1 includes a motor 2 having a gear box. The motor 2 may be an electric motor or any suitable motor for generating pressure to spray the paint.

The motor 2 drives gears that are coupled to a connecting which moves a piston up and down inside a fluid section of the paint sprayer. The speed and/or/cycles (input) of this movement creates a desired output which translates into the paint spray pressure delivered for a desired spray pattern performance.

The motor 2 may be coupled to a control box 21 having a pressure control knob 22 for controlling the motor's speed. A precision motor control mechanism (PMC) may match the motor speed to a desired pressure and selected spray tip size and eliminate pulsation for all pressures and tip sizes.

Paint sprayer 1 may also include a filter system 3 including a filter housing 31 and a paint screening filter 32 that prevents dirt or other particles from moving to the spray tip where they could clog the tip and impede spraying performance.

One or more outlet fittings 33 (hose fittings) may be provided at an outlet portion of the filter system 3. The outlet fitting or fittings 33 are configured to connect a flexible high pressure hose 200 (See FIGS. 8 and 9) so that the filtered paint flows through the flexible hose 200 to a spray gun (not shown). The flexible hoses 200 allow painters to spray at longer distances from the paint sprayer 1 so that the paint sprayer does not have to be relocated. The flexible hoses 200 typically have lengths of fifty to three hundred feet. The provision of multiple outlet fittings 33 allow two or more operators to spray simultaneously, each using an individual hose 200 coupled to a single paint sprayer unit 1.

A pressure relief valve 34 may be provided on the filter system 3. Pressure relief valve 34 may be a mechanical valve that allows for the paint to be primed through the paint sprayer 1. After priming, the painter switches the pressure relief valve 34 to a spray position when ready to spray under high pressure. The pressure relief valve 34 can also be used to relieve the high pressure and allow for cleaning paint from the unit.

A fluid intake conduit 4 is coupled to the motor 2. The fluid intake conduit 4 is in fluid communication with the outlet fitting or fittings 33 and has an inlet end 41 configured to be submerged in a container of paint 100 (See FIG. 6), for example a conventional five gallon bucket of paint. The fluid intake conduit 4 or a portion thereof is submerged into container of paint 100 for direct intake of the paint. The fluid intake conduit 4 functions to siphon the paint which is pressurized to be atomized and sprayed onto a surface by means of a paint spray gun with spray tip (not shown).

Paint sprayer 1 may include a pail hook 5 disposed on a front portion of the unit. The pail hook 5 is used to attach the handle 101 of a paint container 100, such as the handle of a five gallon paint bucket. When moving the paint sprayer to another location, the paint container 100 can be attached to the unit by hanging the handle 101 on the pail hook 5, tilting the paint sprayer 1 back on its lower wheels 6, thereby lifting the paint container 100 of the floor or ground. In this way, the paint container 100 can move with the rolling paint sprayer 1 to another location and the painter does not need to remove the fluid intake conduit 4 out of the paint container 100 when moving the paint sprayer 1 around a jobsite.

Paint sprayer 1 may also have a power cord hook 7 which is used to support a coiled electrical power cord when storing and transporting the paint sprayer 1.

Paint sprayer 1 further includes a cart assembly 8 which supports the motor 2 and the fluid intake conduit 4. The cart assembly 8 includes a frame 9.

Figure 7:
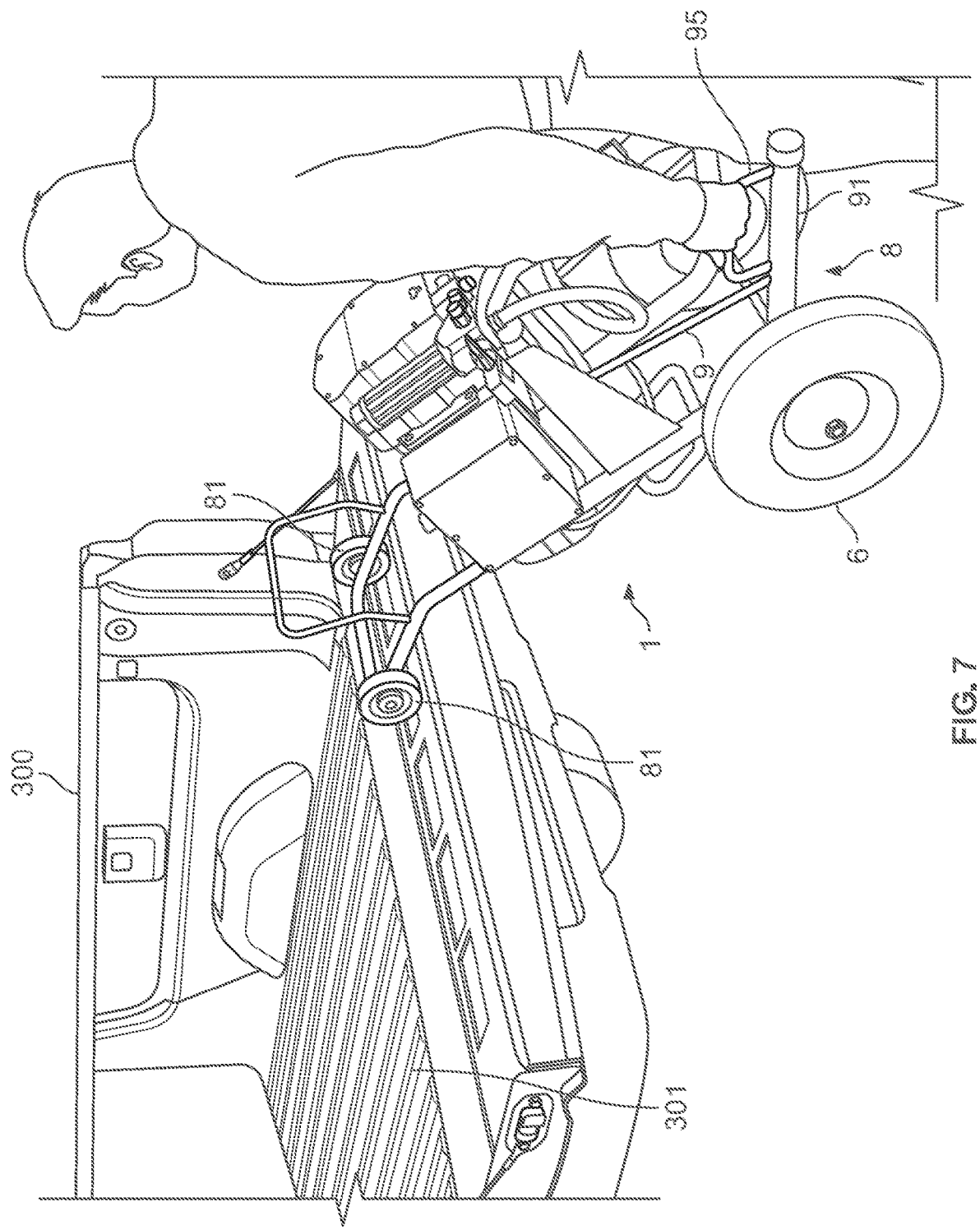
FIG. 7 shows the paint sprayer being loaded onto a support surface of a vehicle.

Frame 9 includes a pair of spaced-apart legs disposed 91 at a lower portion of the frame 9 and configured to support the cart assembly 8 in an upright position of the cart assembly, as shown for example in FIGS. 1-4, 8 and 9. Each of the spaced-apart legs 91 may have a respective grip handle 95 disposed thereon. Grip handles 95 are configured to facilitate lifting the paint sprayer unit 1 and tilting it backward from an upright position to a horizontal position for easy loading and unloading into a vehicle 300, as shown in FIG. 7.

Figure 8:
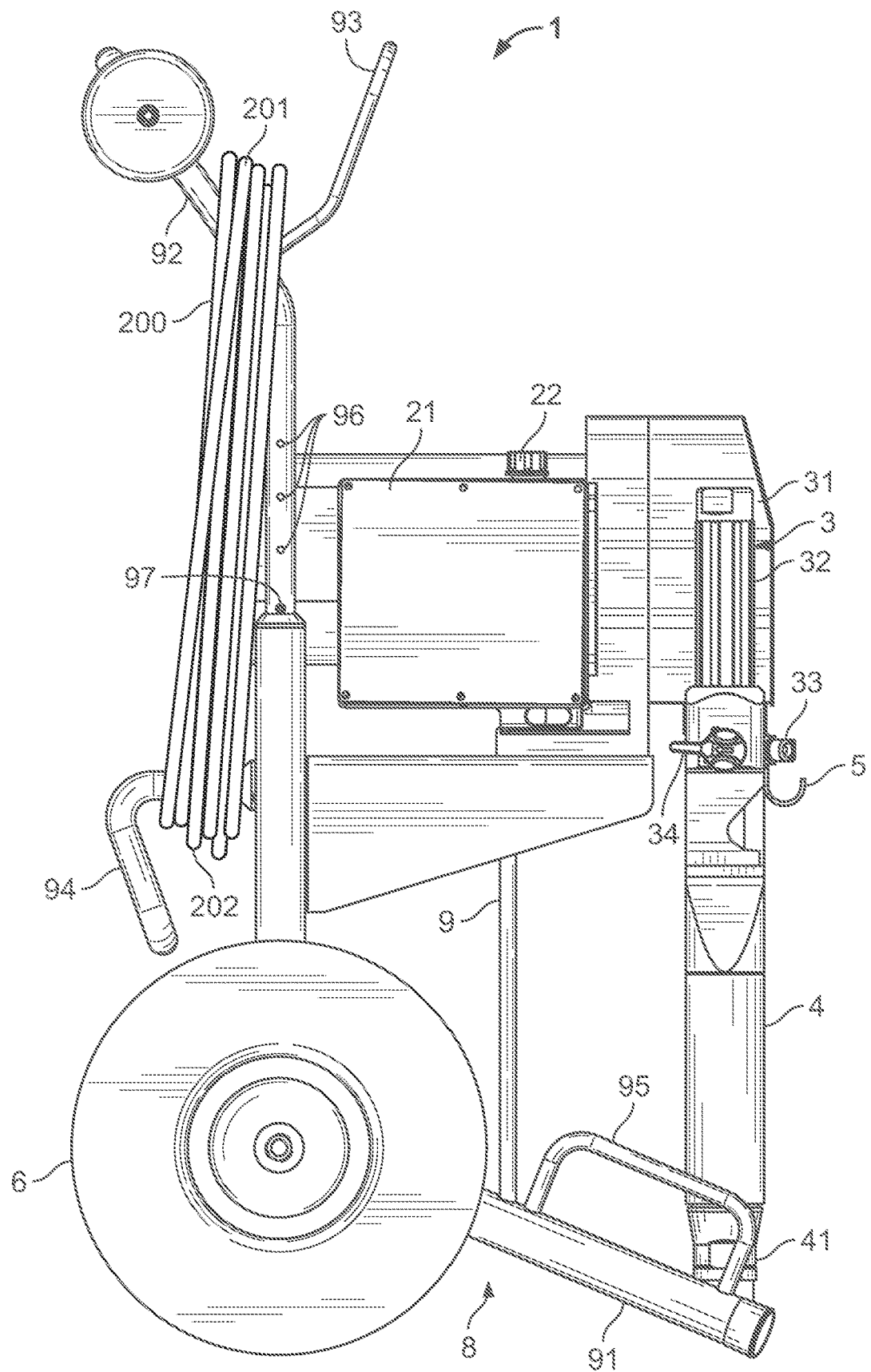
FIG. 8 shows the paint sprayer supporting a coiled flexible hose between the upper bracket and the telescoping support with the telescoping handle in an extended handle position.
Figure 9:
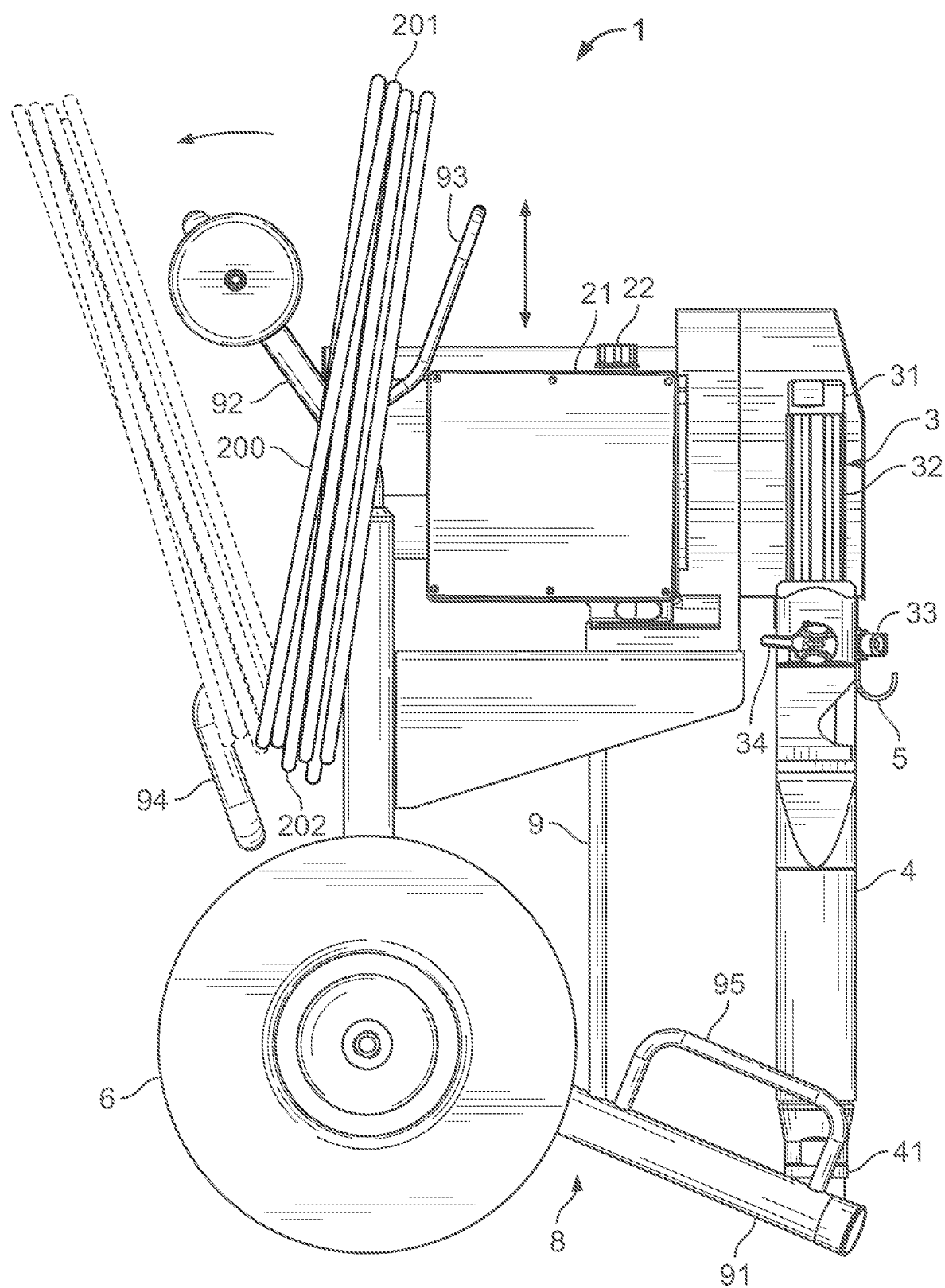
FIG. 9 shows the telescoping handle in a retracted handle position for removing the coiled flexible hose from the upper bracket and the telescoping support.

Frame 9 also has a telescoping handle 92 disposed at an upper portion of the frame 9 and movable between a retracted handle position, shown for example in broken line in FIGS. 1-4 and an extended handle position, shown for example in solid line in FIGS. 1-4. FIG. 8 shows telescoping handle 92 in the extended handle position for supporting a coiled flexible hose 200 and FIG. 9 shows telescoping handle 92 in the retracted handle position for removal of the coiled flexible hose 200.

Figure 5:
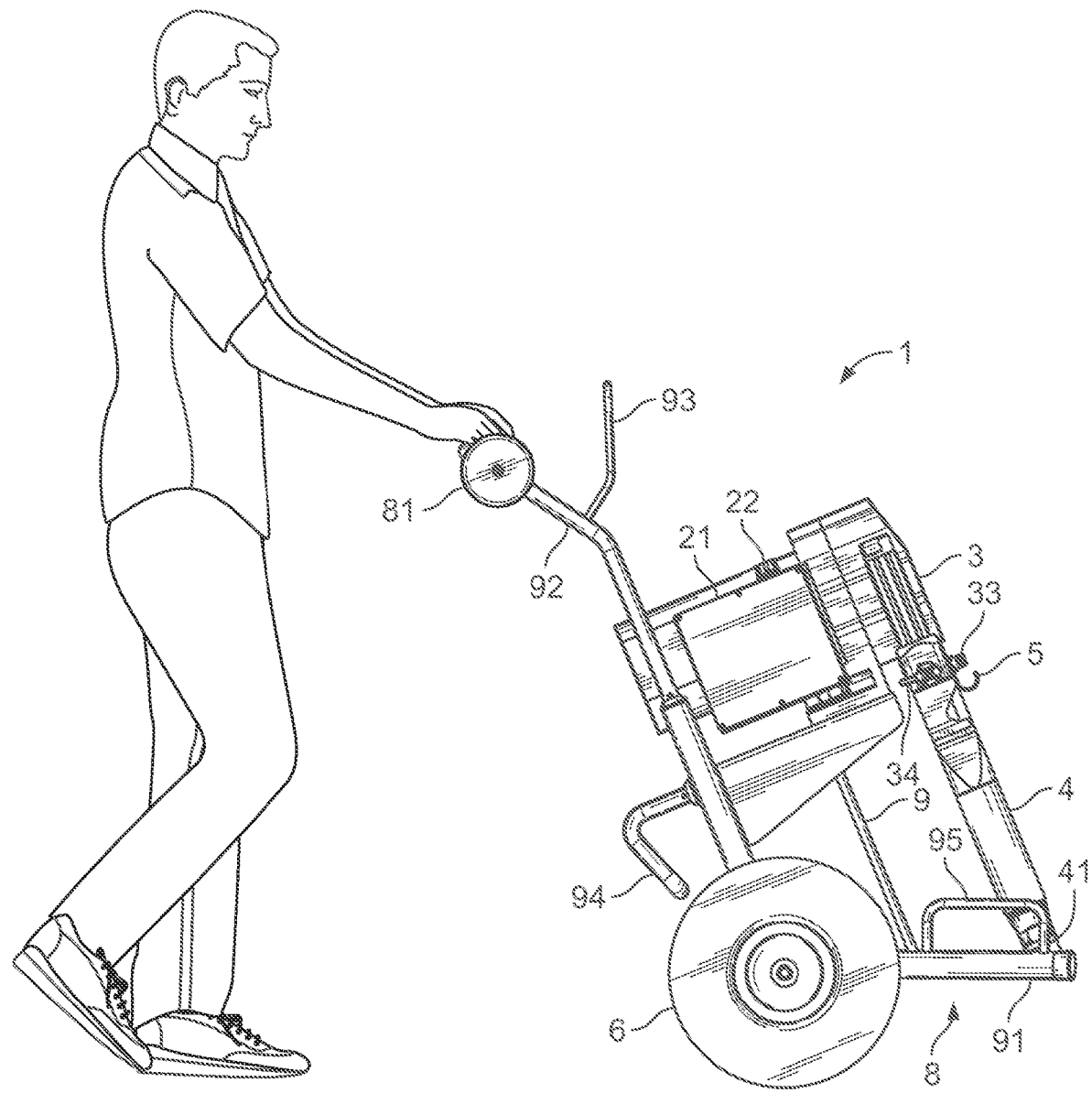
FIG. 5 shows the paint sprayer tilted back from an upright position for moving the paint sprayer to a selected location.

Telescoping handle 92 may include a locking mechanism configured for locking the telescoping handle 92 in at least the retracted handle position and the extended handle position. The locking mechanism can include a plurality of spaced apart openings 96 and a spring biased button 97. Spring biased button 97 is configured to engage a selected one of the spaced apart openings in order to lock the telescoping handle 92 in a desired position, for example in an extended position for rolling the paint sprayer unit 1 to a location for use, as shown in FIG. 5 or a retracted position for transporting or storing the paint sprayer unit 1 or for removing the coiled flexible hose 200 as shown in FIG. 9.

Frame 9 has an upper bracket 93 projecting from the telescoping handle 92 and configured to receive a first or upper portion 201 of a coiled flexible hose 200.

Figure 6:
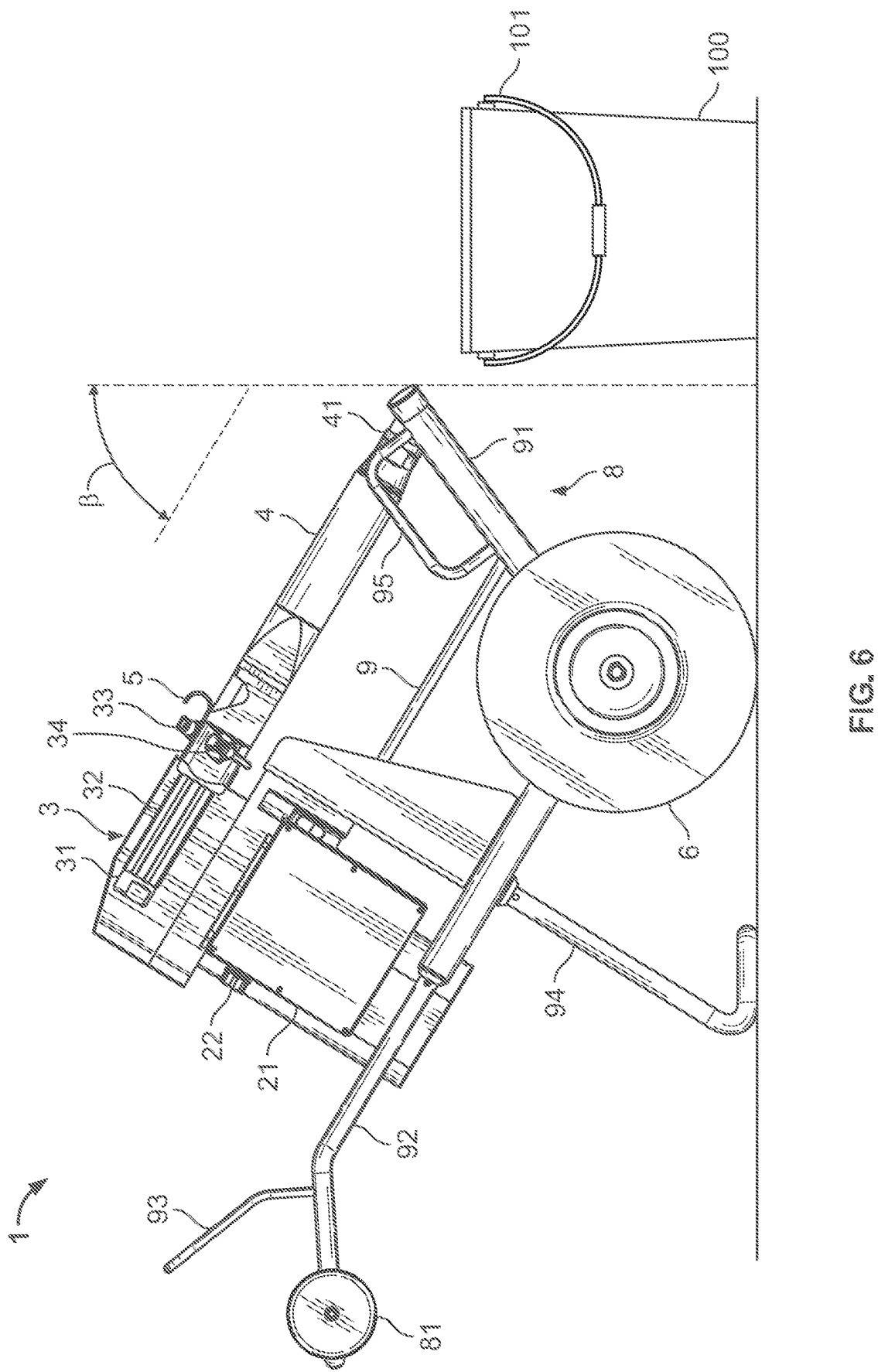
FIG. 6 shows the paint sprayer tilted back and supported by a telescoping support for placing a container of paint under an inlet end of the fluid intake conduit.

Frame 9 also has a telescoping support 94 disposed between the lower portion of the frame 9 and the upper portion of the frame 9 and movable between a retracted support position, shown for example in solid line in FIGS. 1-4 and an extended support position, shown for example in broken line in FIGS. 1-4. Telescoping support 94 is configured to support the cart assembly 8 in an inclined position of the cart assembly 8 between the upright position of the cart assembly and a horizontal position of the cart assembly 8 as shown in FIG. 6. Telescoping support 94 is moved to its retracted position when loading and unloading the paint sprayer 1, which allows the unit to roll on its at least one upper wheel 81 and lower wheels 6.

Telescoping support 94 may include a locking mechanism configured for locking the telescoping support 94 in at least in the retracted support position and the extended support position. The locking mechanism can be substantially the same as described above for telescoping handle 92 and can include a plurality of spaced apart openings 98 and a spring biased button 99 configured to engage a selected one of the spaced apart openings 98 in order to lock the telescoping support 94 in a desired position. As shown in FIG. 6, telescoping support 94 may be locked in a position to support paint sprayer 1 so that a container 100 of paint can be easily placed under an inlet end 41 of the fluid intake conduit 5.

Telescoping support 94 is configured to receive a second or lower portion 202 of the coiled flexible hose 200 as shown in FIGS. 8 and 9.

Figure 3:
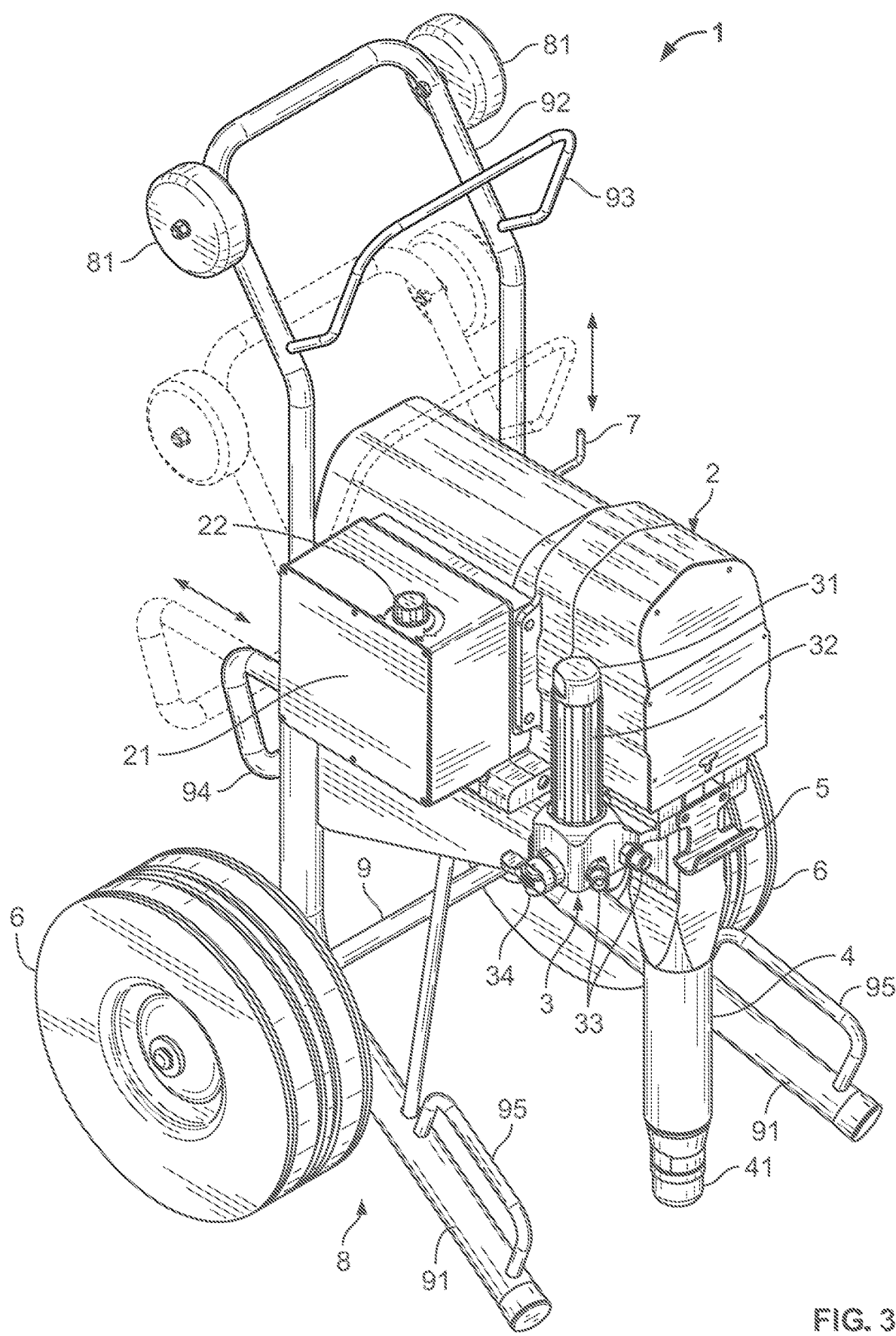
FIG. 3 shows a perspective view of a paint sprayer according to another embodiment of the invention.
Figure 4:
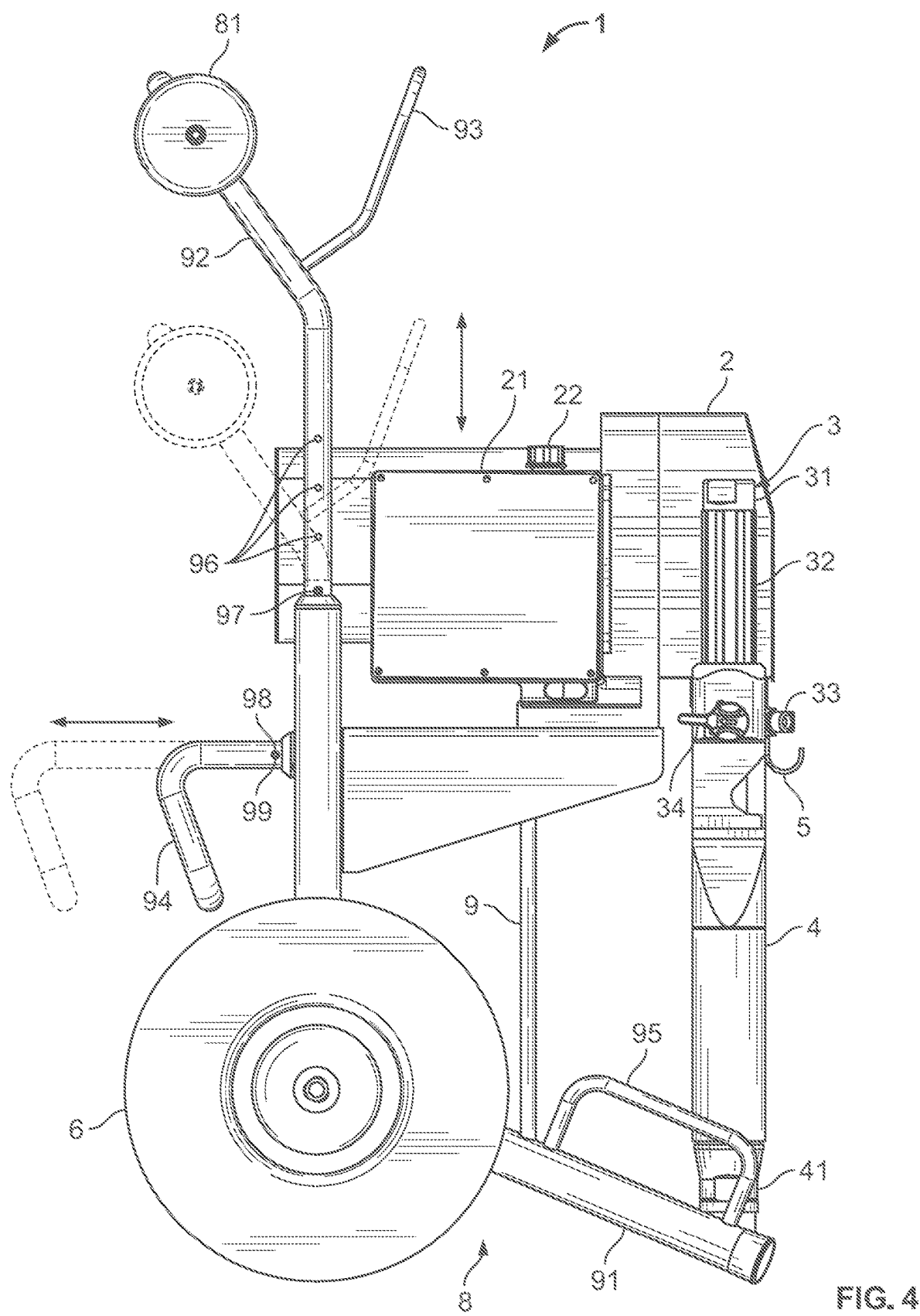
FIG. 4 shows a side view of the paint sprayer shown in FIG. 3.

Cart assembly 8 includes a pair of lower wheels 6 disposed at the lower portion of the frame 9 and configured for rolling the cart assembly 8 when tilted back from the upright position as shown in FIG. 5. At least one upper wheel 81 is disposed on the telescoping handle 92 and is configured for rolling the cart assembly 8 along with the pair of lower wheels 6 when the paint sprayer 1 is in a horizontal position. The at least one upper wheel 81 may be a single upper wheel 81 which is centered on the cross member of the telescoping handle 92 as shown in FIGS. 1 and 2, a pair of upper wheels 81 as shown in FIGS. 3 and 4, or any suitable number of upper wheels. Preferably the one or more upper wheels 81 are smaller in diameter than lower wheels 6.

In order to operate and transport a paint sprayer 1 according to an aspect of the invention, a paint sprayer 1 having a motor 2 with a gear box 21, a fluid intake conduit 4 coupled to the motor 2, an outlet fitting 33 in fluid communication with the fluid intake conduit 4 and a cart assembly 8 supporting the motor 2 and the fluid intake conduit 4 is provided. The cart assembly 8 includes a frame 9 having a pair of spaced-apart legs 91 disposed at a lower portion of the frame 9, a telescoping handle 92 disposed at an upper portion of the frame 9, an upper bracket 93 projecting from the telescoping handle 92 and a telescoping support 94 disposed between the lower portion of the frame 9 and the upper portion of the frame 9. The cart assembly 8 further includes a pair of lower wheels 6 disposed at the lower portion of the frame 9 and at least one upper wheel 81 disposed on the telescoping handle 92.

As illustrated in FIG. 5, the paint sprayer 1 can be moved to a selected location by grasping the telescoping handle 92, tilting the cart assembly 8 back from an upright position of the cart assembly 8 and rolling the cart assembly 8 on the pair of lower wheels 6.

As illustrated in FIG. 6, the telescoping support 94 may be extended and locked into an extended support position and the cart assembly 8 tilted back such that the paint sprayer 1 is supported by the telescoping support 94 in an inclined position of the cart assembly 8 between the upright position of the cart assembly 8 and a horizontal position of the cart assembly 8 for placing a container of paint 100 under an inlet end 41 of the fluid intake conduit 4. The telescoping support 94 may be configured to support the cart assembly 8 in an inclined position is in the range of 45 to 60 degrees from the upright position of the cart assembly (See FIG. 6, angle β).

The telescoping support 94 may also be retracted and locked into a retracted support position the paint sprayer 1 loaded the paint sprayer onto a support surface 301 of a vehicle 300 by positioning the at least one upper wheel 81 on the support surface 301 of the vehicle 300, lifting the cart assembly 8 into the horizontal position and rolling the cart assembly 8 onto the support surface 301 on the pair of lower wheels 6 and the at least one upper wheel 81. The support surface 301 of the vehicle 300 can be a truck bed, a floor of a van, a trailer bed or any other suitable surface. In this way, loading and unloading of the paint sprayer 1 can be accomplished by a single operator without the use of a ramps or other equipment. The loading and unloading operation may be facilitated by grasping respective grip handles 95 provided on each of the spaced apart legs 91 of the frame, as shown in FIG. 7.

The telescoping support 94 is preferably locked in a selected extended support position or retracted position using a locking mechanism, for example a plurality of spaced apart openings 98 which are engaged by a spring biased button 99.

A coiled flexible hose 200 adapted to be coupled to an outlet fitting 33 at one send and a paint spray gun at the other end can be supported between the upper bracket 93 and the telescoping support 94 with the telescoping handle in an extended handle position as shown in FIG. 8. The telescoping handle 92 is then moved from the extended handle position to a retracted handle position as shown in FIG. 9. This allows the coiled flexible hose 200 to be easily removed from the upper bracket 93 and the telescoping support 94 as shown in FIG. 9.

Although a number of embodiments of the present invention have been shown and described, it is obvious that many changes and modifications may be made thereunto without departing from the spirit and scope of the invention.

What is claimed is:

1. A paint sprayer comprising:
   a motor having a gear box;
   a fluid intake conduit coupled to the motor, the fluid intake conduit comprising an inlet end configured to be submerged in a container of paint;
   an outlet fitting in fluid communication with the fluid intake conduit; and
   a cart assembly supporting the motor and the fluid intake conduit;
   wherein the cart assembly comprises a frame;
   the frame comprising:
      a pair of spaced-apart legs disposed at a lower portion of the frame and configured to support the cart assembly in an upright position of the cart assembly;
      a telescoping handle disposed at an upper portion of the frame and movable between a retracted handle position and an extended handle position;
      an upper bracket projecting from the telescoping handle and configured to receive a first portion of a coiled flexible hose; and
      a telescoping support disposed between the lower portion of the frame and the upper portion of the frame and movable between a retracted support position and an extended support position, wherein the telescoping support is configured to support the cart assembly in an inclined position of the cart assembly between the upright position of the cart assembly and a horizontal position of the cart assembly and wherein the telescoping support is configured to receive a second portion of the coiled flexible hose; and
   wherein the cart assembly further comprises a pair of lower wheels disposed at the lower portion of the frame and configured for rolling the cart assembly when tilted back from the upright position and at least one upper wheel disposed on the telescoping handle and configured for rolling the cart assembly along with the pair of lower wheels when in the horizontal position.

2. The paint sprayer according to claim 1, wherein the motor comprises an electric motor.

3. The paint sprayer according to claim 1, wherein the at least one upper wheel comprises a pair of upper wheels.

4. The paint sprayer according to claim 1, further comprising a respective grip handle disposed on each of the pair of spaced-apart legs.

5. The paint sprayer according to claim 1, wherein the telescoping handle comprises a locking mechanism configured for locking the telescoping handle in the retracted handle position and the extended handle position.

6. The paint sprayer according to claim 5, wherein the locking mechanism comprises a plurality of spaced apart openings and a spring biased button.

7. The paint sprayer according to claim 1, wherein the telescoping support comprises a locking mechanism configured for locking the telescoping support in the retracted support position and the extended support position.

8. The paint sprayer according to claim 7, wherein the locking mechanism comprises a plurality of spaced apart openings and a spring biased button.

9. A method for operating and transporting a paint sprayer, the method comprising the steps of:
   providing a paint sprayer comprising a motor having a gear box, a fluid intake conduit coupled to the motor, an outlet fitting in fluid communication with the fluid intake conduit, a cart assembly supporting the motor and the fluid intake conduit, the cart assembly comprising a frame having a pair of spaced-apart legs disposed at a lower portion of the frame, a telescoping handle disposed at an upper portion of the frame, an upper bracket projecting from the telescoping handle and a telescoping support disposed between the lower portion of the frame and the upper portion of the frame, the cart assembly further comprising a pair of lower wheels disposed at the lower portion of the frame and at least one upper wheel disposed on the telescoping handle;
   moving the paint sprayer to a selected location by grasping the telescoping handle, tilting the cart assembly back from an upright position of the cart assembly and rolling the cart assembly on the pair of lower wheels;

extending the telescoping support into an extended support position and tilting the cart assembly back such that the paint sprayer is supported by the telescoping support in an inclined position of the cart assembly between the upright position of the cart assembly and a horizontal position of the cart assembly for placing a container of paint under an inlet end of the fluid intake conduit; and retracting the telescoping support into a retracted support position and loading the paint sprayer onto a support surface of a vehicle by positioning the at least one upper wheel on the support surface of the vehicle, lifting the cart assembly into the horizontal position and rolling the cart assembly onto the support surface on the pair of lower wheels and the at least one upper wheel.

10. The method according to claim 9, wherein the step of lifting the cart assembly into the horizontal position comprises grasping each of a respective grip handle disposed on each of the pair of spaced-apart legs.

11. The method according to claim 9, wherein the step of extending the telescoping support into the extended support position comprises locking the telescoping support in the extended support position with a locking mechanism.

12. The method according to claim 9, wherein the step of retracting the telescoping support into the retracted support position comprises locking the telescoping support in the retracted support position with a locking mechanism.

13. The method according to claim 9, further comprising the steps of:

supporting a coiled flexible hose between the upper bracket and the telescoping support with the telescoping handle in an extended handle position;

moving the telescoping handle from the extended handle position to a retracted handle position; and removing the coiled flexible hose from the upper bracket and the telescoping support.

14. The method according to claim 9, wherein the inclined position of the cart assembly is in the range of 45 to 60 degrees from the upright position of the cart assembly.

15. The method according to claim 9, wherein the support surface of the vehicle comprises a truck bed or a floor of a van.

16. The method according to claim 9, wherein the step of loading the paint sprayer onto the support surface of the vehicle is completed without the use of a ramp.

* * * * *